(12) United States Patent
Driesen et al.

(10) Patent No.: US 8,972,934 B2
(45) Date of Patent: Mar. 3, 2015

(54) SUPPORT FOR TEMPORALLY ASYNCHRONOUS INTERFACE EXTENSIONS

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 960 days.

(21) Appl. No.: 12/973,834

(22) Filed: Dec. 20, 2010

(65) Prior Publication Data

US 2012/0159435 A1  Jun. 21, 2012

(51) Int. Cl.
*G06F 9/44* (2006.01)
*G06F 15/16* (2006.01)
*G06F 9/54* (2006.01)

(52) U.S. Cl.
CPC ..................................... *G06F 9/541* (2013.01)
USPC ............................. 717/120; 717/162; 709/203

(58) Field of Classification Search
None
See application file for complete search history.

(56) References Cited

U.S. PATENT DOCUMENTS

| | | | | |
|---|---|---|---|---|
| 7,167,862 | B2 * | 1/2007 | Mullins | 1/1 |
| 7,433,917 | B2 * | 10/2008 | Renaud | 709/203 |
| 7,543,019 | B1 * | 6/2009 | Cormier | 709/203 |
| 7,653,687 | B2 * | 1/2010 | Reisman | 709/203 |
| 7,757,210 | B1 * | 7/2010 | Krueger | 717/120 |
| 7,836,439 | B2 * | 11/2010 | Shenfield | 717/162 |
| 8,086,592 | B2 * | 12/2011 | Mion et al. | 707/711 |
| 8,321,852 | B2 * | 11/2012 | Shenfield | 717/162 |
| 2003/0093551 | A1 * | 5/2003 | Taylor et al. | 709/237 |
| 2004/0015858 | A1 * | 1/2004 | Seto et al. | 717/120 |
| 2006/0095439 | A1 * | 5/2006 | Buchmann et al. | 707/100 |
| 2006/0101442 | A1 * | 5/2006 | Baumgart et al. | 717/162 |
| 2007/0234291 | A1 * | 10/2007 | Ronen et al. | 717/120 |
| 2009/0144295 | A1 * | 6/2009 | Mion et al. | 707/100 |
| 2009/0265686 | A1 * | 10/2009 | Lucas et al. | 717/120 |
| 2010/0235433 | A1 * | 9/2010 | Ansari et al. | 709/203 |
| 2010/0299663 | A1 * | 11/2010 | Weissman et al. | 717/170 |

OTHER PUBLICATIONS

Juric et al.WSDL and UDDI extensions for version support in web services, The Journal of Systems and Software 82 (2009) pp. 1326-1343, Retrieved on [Oct. 14, 2014] Retrieved from the Internet: URL<http://www.sciencedirect.com/science/article/pii/S0164121209000478#>.*

(Continued)

*Primary Examiner* — Thuy Dao
*Assistant Examiner* — Cheneca Smith
(74) *Attorney, Agent, or Firm* — Mintz Levin Cohn Ferris Glovsky and Popeo, P.C.

(57) ABSTRACT

A data object can be received at a first time at a first inbound interface of a first software component from a second software component. The first inbound interface can be configured to map a first feature of the data object to at least one first internal data structure of the first software component but not configured to map a second data feature of the data object to any corresponding internal data structure of the first software component. Characteristic information of the second data feature can be stored in a generic data container added to the internal data structure. The characteristic information can include a value of the second data feature and metadata describing an identifier of the second data feature. A reconstructed data object can be formed at a second time subsequent to the first time. Related methods, systems, and articles of manufacture are disclosed.

13 Claims, 8 Drawing Sheets

(56) References Cited

OTHER PUBLICATIONS

Vallecillo et al. Object Interoperability. Lecture Notes in Computer Science, vol. 1743, 1999, pp. 1-21. Retrieved on [Oct. 14, 2014] Retrieved from the Internet: URL< http://download.springer.com/static/pdf/135/chp%253A10.1007%252F3-540-46589-8_1.pdf?auth66=1413307951_5b4e76d9c790a3ec5e8abeda588b1b04&ext=.pdf>.*

* cited by examiner

SUPPORT FOR TEMPORALLY ASYNCHRONOUS INTERFACE EXTENSIONS

TECHNICAL FIELD

The subject matter described herein relates to supporting interface extensions that occur asynchronously in time for different systems communicating in a networked environment.

BACKGROUND

In a distributed business systems landscape, any two or more business systems communicating with each other must agree on and use a common communications interface. A business system cannot unilaterally alter the agreed upon interface contract without breaking the ability to communicate with the other system or systems. A unilateral alteration can occur in the example of a first business system in a landscape being upgraded to a new software or operating system version that has enhanced interfaces while one or more other systems with which the first system communicates are not upgraded. In this example situation or in others in which one but not all communicating system undergo an interface change, communications between systems with incompatible interfaces can fail. For example, a newer version may communicate using data objects containing additional data field that are not present in and therefore not recognized by an older version of the interface.

One approach to this problem can be the use of process oriented field extensibility in which customer extension fields are forwarded across systems, for example of an external service provider, that have been specifically prepared for communication with a system that operates on a different interface version. This approach can be quite cumbersome, as it requires action for any communicating system as soon as any other system within a networked architecture undergoes an interface change.

As more and more business systems in a networked landscape communicate with each other, the interdependencies increase to a point where either the whole landscape needs to be upgraded at the same time or not at all. Neither alternative is desirable.

SUMMARY

In one aspect, a computer-implemented method can include includes receiving, at a first time, a data object from a second software component at a first inbound interface of a first software component. The first inbound interface is configured to map a first feature of the data object to at least one first internal data structure of the first software component but not configured to map a second data feature of the data object to any corresponding internal data structure of the first software component. Characteristic information of the second data feature is stored in a generic data container added to the internal data structure. The characteristic information includes a value of the second data feature and metadata describing an identifier of the second data feature. A reconstructed data object is formed at a second time subsequent to the first time. The reconstructing includes recreating the second data feature based on the characteristic information retrieved from the generic data container and combining the recreated second data feature with the first data feature retrieved from the at least one first internal data structure.

In some variations one or more of the following can optionally be included. The reconstructed data object can be promoted. The promoting can include sending the reconstructed data object to a third component via an outbound interface of the first component. The third component can include a third inbound interface configured to map the second data feature to at least one third internal data structure of the third software component. The sending can be completed such that the reconstructed data object appears to the third software component as though the reconstructed data object were formed by retrieving the second data feature from at least one second internal data structure that is not present in the first component. The second component and the third component can be configured to a newer version level of a software architecture than is the first component. The newer version can include the second data feature that is not present in an older version to which the first component is configured. The second data feature can include an extension field used by the first component but not by the second component.

The first software component can include an application server of a multi-tenant software architecture and the second software component can include an external software component whose functionality is integrated into the multi-tenant software architecture. The multi-tenant architecture can include the application server and a data repository. The application server can provide access for each of a plurality of organizations to one of a plurality of client tenants. Each of the plurality of client tenants can include a customizable, organization-specific version of a core software platform. The data repository can include core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

For the purposes of the description presented herein, the term "component" is used to refer to business systems, applications, application components, and the like. The subject matter described herein provides many advantages. For example, a business system landscape including multiple heterogeneous components can undergo incremental upgrade and other lifecycle management processes incrementally without negatively impacting communications between components that at least temporarily operate on different versions of communication interfaces. Extension fields added to a standard business object to customize the standard business object for a specific component can be handled by other components even if those other components are not aware of the definitions of the extension fields. Interface changes across software versions, for example changes introduced by component upgrades or other lifecycle management processes, can also be readily handled using the current subject matter.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
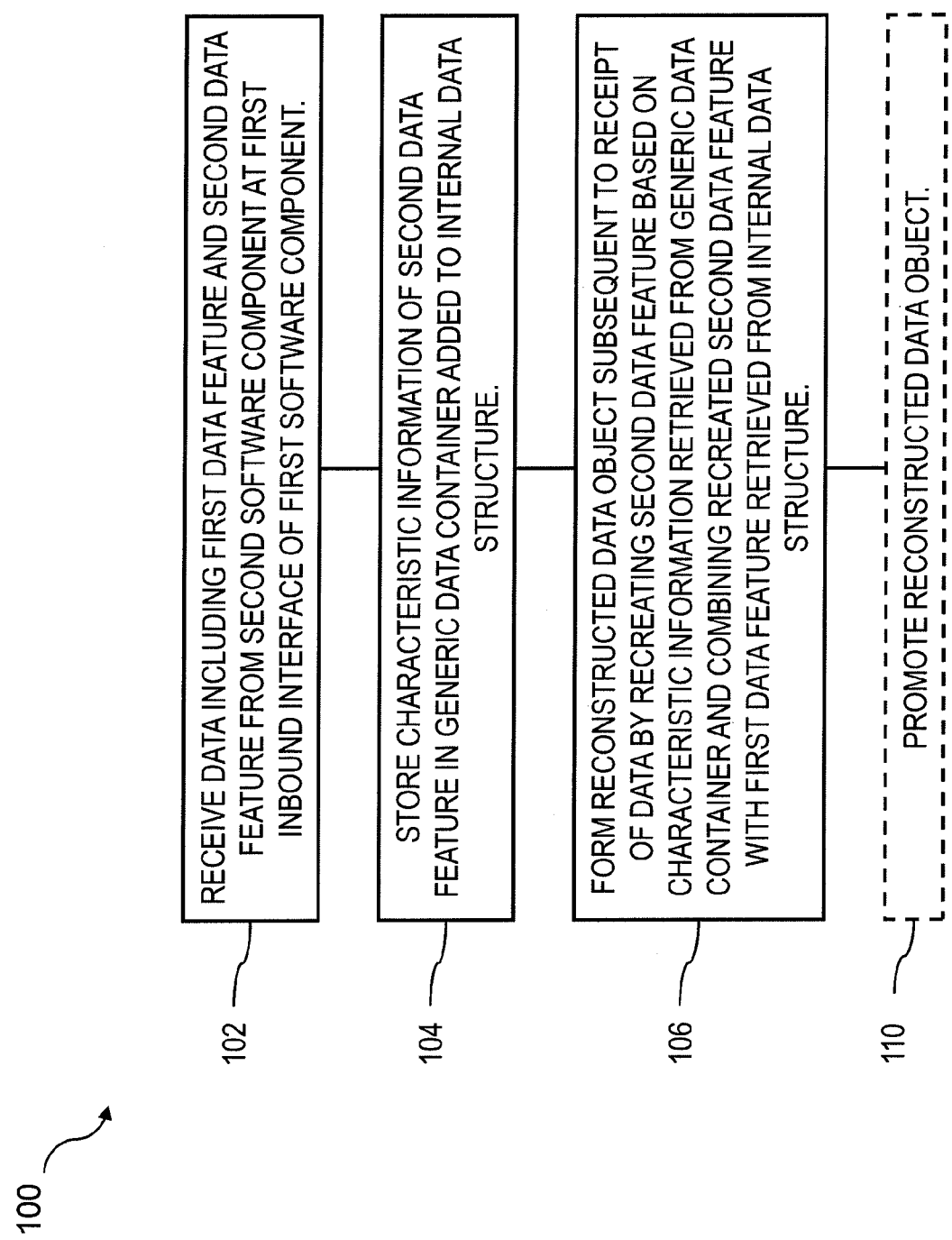
FIG. 1 is a process flow diagram illustrating aspects of a method consistent with implementations of the current subject matter.

To address the above-noted and potentially other issues with currently available solutions, one or more implementations of the current subject matter provide methods, systems, articles or manufacture, and the like that can, among other possible advantages, provide for data communication in a distributed network environment, such as for example in an architecture of networked components, in which individual users and administrators cannot control aspects of the lifecycle state of all of the networked components. Heterogeneous system landscapes that include multiple components can be supported, as can component-specific extension fields and interface changes across software versions, such as for example temporally asynchronous changes to components introduced by upgrades.

One or more implementations of the current subject matter can enable a component to accept unilateral enhancements of interfaces in other business systems, applications, application components, and the like by accepting additional data features such as for example fields, nodes, etc. despite lacking an interface and/or internal data structures that support or are otherwise compatible with the additional data features. A component can retain characteristic information about the additional data feature or features, and also store and forward this characteristic information generically to other components despite the additional data features being foreign to the component's current state or configuration.

In an implementation of the current subject matter, a first component having an older version or configuration or an older version or configuration interface is upgraded or otherwise modified to a newer version or configuration. During the time that the first component and/or its interface exists in the older version or configuration, data objects received at the first component from other components having the newer version or configuration can include one or more data features for which the first component does not include a corresponding internal data structure and/or lacks interface functionality necessary to map the one or more data features appropriately to corresponding internal data structures. Such features can be retained by the first component in a generic persistence until the upgrade to the newer version or configuration. Upon the first component being upgraded to the newer version or configuration, the one or more data features can be recreated based on the contents of the generic persistence. The generic persistence can store characteristic information of the one or more data features. The term generic is used herein to refer to a data storage format in which no knowledge of the format, structure, etc. of the parent data feature is required.

In a non-limiting example, the generic persistence can include a table storing the characteristic information in a row format, a column format, a combination of both row and column formats or the like. Generic categories of characteristic information can include an identifier column, a descriptive information column, and one or more content columns. The identifier column can include, for each retained data feature, a value indicating or identifying a data object that originally included a data feature that the current version or configuration of the first component is not capable of mapping to its internal data structure. The descriptive information column can include a description or other semantic statements relating to type, functionality, etc. of the retained data feature. The one or more content columns can include values, code segments, or the like of the specific instance of the data feature being retained in the generic persistence. A data feature as discussed herein can include process data and/or master data. Master data can be exchanged between components in a peer-to-peer communication and/or supported by a central master data management system.

The process flow diagram 100 of FIG. 1, illustrates features of a method consistent with one or more implementations of the current subject matter. At 102, data ARE received from a second software component at a first inbound interface of a first software component on a first computing system comprising a programmable processor. The first inbound interface can be configured to map a first feature of the data to at least one first internal data structure (e.g. a data object) of the first software component but not configured to map a second data feature of the data to any corresponding internal data structure of the first software component. Characteristic information of the second data feature is stored at 104 in a generic data container added to the internal data structure. The characteristic information can include a value of the second data feature and metadata describing the second data feature. At 106, a reconstructed data object is formed at a second time subsequent to the first time. The reconstructing includes recreating the second data feature based on the characteristic information retrieved from the generic data container and combining the recreated second data feature with the first data feature retrieved from the at least one first internal data structure.

Optionally, at 110 the reconstructed data object can be promoted. For the purposes of this disclosure, promoting of a data object can include, but is not limited to, one or more of sending the data object to another component, which can be part of the same system as the first component or part of a different system. Promoting of a data object can also or in addition optionally include storing the reconstructed data object for use by the first component. The storing can occur, for example, if the reconstructing of the data object is performed in conjunction with a software upgrade that causes the first software component to include a corresponding internal data structure to which the second data feature can be mapped.

In some implementations, the reconstructed data object can be sent to a third component via an outbound interface of the first component. The third component can include a third inbound interface configured to map the second data feature to at least one third internal data structure of the third software component. The sending of the reconstructed data object can be completed in such a manner that the reconstructed data object appears to the third software component as though the reconstructed data object were formed by retrieving the second data feature from at least one second internal data structure that is not actually present in the first component. The second component and the third component can therefore be configured to a newer version level of a software architecture than is the first component, and the newer version can include the at least one second data feature that is not present in an older version to which the first component is configured.

Figure 2:
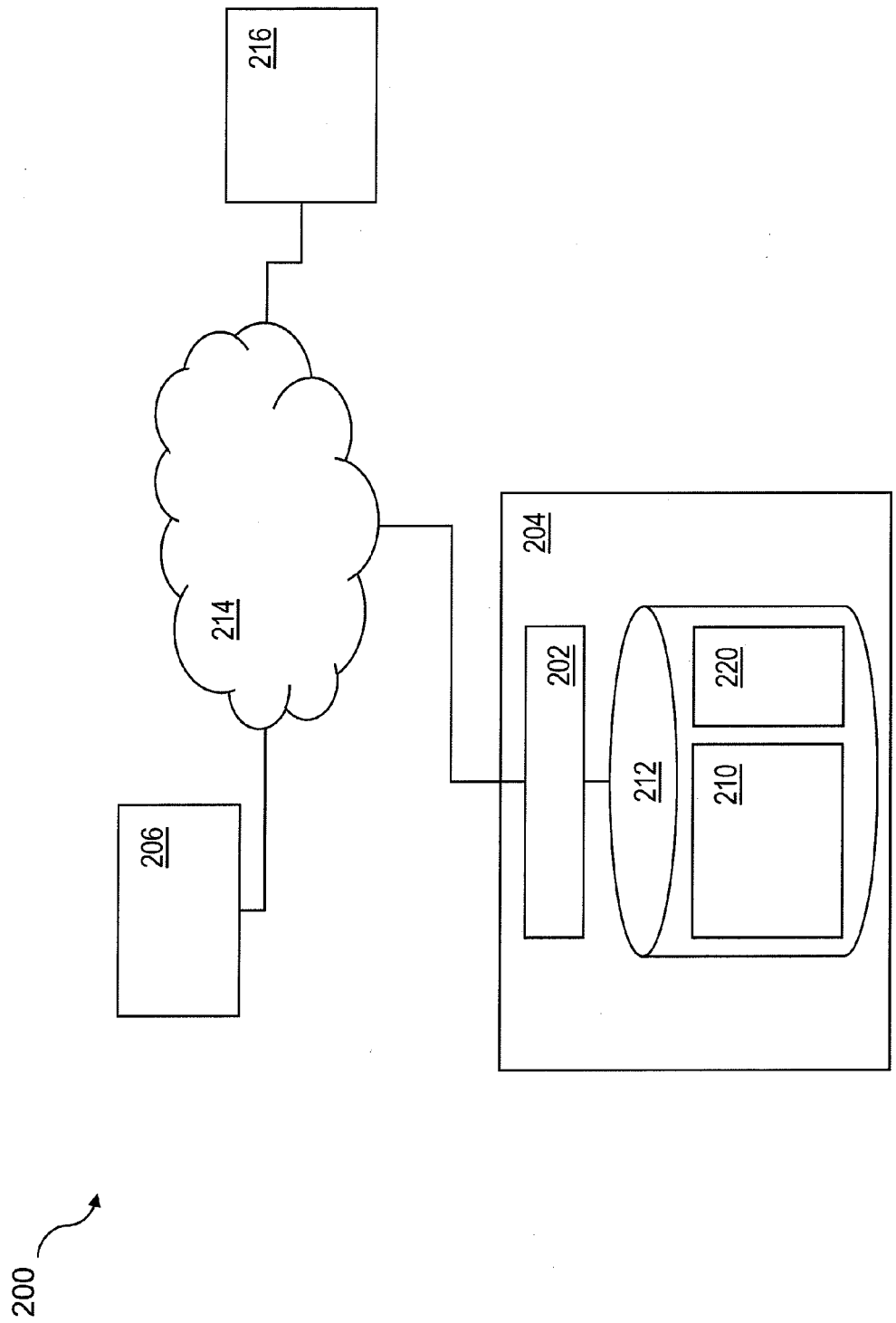
FIG. 2 is a box diagram illustrating aspects of a system consistent with implementations of the current subject matter.

In an implementation illustrated in the system diagram 200 of FIG. 2, an inbound interface 202 of a first component 204 that receives data from another system (or another component in the same system) 206 can detect that there are new fields or nodes in the received data that the inbound interface 202 is not configured to map to the internal data structures (e.g. a data object) 210 retained in a data repository 212 or the like accessible by the first component 204. The data can be received by the inbound interface 202 by one or more of a variety of ways, including over a network 214 (for example as shown in FIG. 2), via a direct connection to the other system or component 206, or the like. The inbound interface 202 can call a time delayed extension module 216, that can be part of the first component 204, included on the same physical system as the first component, or accessed from another system, for example via the network 214 (as shown in FIG. 2), via another network, via a direct connection, or the like. The time delayed extension module 216 adds a container 220 to the internal data structure 210 of the first component 202. The data elements of the received data that cannot be mapped to existing fields of data objects or the like within the internal data structure 210 can be stored in a generic format, such as for example name-value pairs or the like in the container 220.

The time delayed extension module 216 can initiate a task for a key user. This task can indicate to the key user that the inbound interface 202 has received additional data or data fields that it is/are not configured to map to the internal data structures 210 and can offer to the key user one or more options how to proceed. The options can include dropping the additional data, storing the additional data generically for future use, and initiate a field extensibility process for the internal data structure 210.

Dropping the additional data that cannot be mapped to the internal data structure 210 of the first component is the approach typically taken in currently available solutions. The additional data, fields, etc. are not passed by the inbound interface 202 to the internal data structure 210, but are instead simply discarded. Using this approach, even if the internal data structure 210 of the first component 204 were extended in the future (e.g. by upgrading the first component 204 to a newer version that supports the additional data fields), the data to be mapped to these newly extended fields, etc. that had been sent prior to the extending of the internal data structure 210 would not be available at the first component 204. Populating the newly extended fields of the internal data structure 210 of the first component 202 therefore requires initiation of a reconciliation process in which the previously discarded data are resent to the inbound interface 202.

An improvement provided by implementations of the current subject matter includes the ability to store the unmappable data in a generic format that defers a need to parse the content and semantics of the received data. Rather, the unmappable data are stored in the generic container 220 appended to or otherwise associated with the internal data structure 210. If the data are sent to another business system or component via an outbound interface, the data in the generic container 220 can be forwarded to that business system or component. Additionally, once the first component receives an upgrade or other change that makes the internal data structure 210 compatible with the previously unmappable data, the data extensions can be retrieved by the time delayed extension module 216 from the generic container 220. The time delayed extension module 216 can identify the data objects, etc. of the upgraded internal data structure 210 to which the data in the generic container 220 should be mapped. The new field or fields can be extended by a unique identifier, for example to enable identification of how the new fields added via the upgrade actually map to the fields stored in the generic container 220. Alternatively, a key user can assign a mapping of the fields in the generic container 220 to the new fields, for example based on semantic matches between the new fields and the information stored in the generic container 220.

Initiating a field extensibility process for the internal data structure can be an included option to improve cross-system field extensibility. With current approaches, such cross-system field extensibility is generally available only between business systems or components that were built by the same vendor or that have been specifically prepared for this functionality. Implementations of the current subject matter can enable process-oriented field extensibility in heterogeneous business system landscapes. An end-user extensibility tool can allow a key user, administrator, or the like at a customer organization to add field extensions to existing data objects when a new field is detected. The extensibility tool can be pre-configured by the time delayed extension module 216 with the field name and the mapping information for the inbound interface 202. In one example of this process, a key user can be prompted to indicate that a field in an incoming message is not included in the internal data structure 210 and queried whether the key user wishes to add the new field to the internal data structure 210. The key user can define the field naming for the user interface while the extension tool specifies a technical name for the field and a type of the incoming message. Once the field is added to the internal data structure 210, the data stored in the generic container 220 can be copied, mapped, or the like to the new extension field and deleted from the generic container 220.

In some implementations, the time delayed extension module 216 can include an interface to enable communications with one or more inbound interfaces 202 of components 204 of a system landscape. An inbound interface 202 can deliver the additional data to the time delayed extension module 216, for example by specifying an interface identifier for the inbound interface 202 and an internal data structure identifier. The time delayed extension module 216 can also include a generic storage extension module that uses the internal data structure identifier to create storage for the extension data in a generic form. For example, the extension data can be stored as key-value pairs and a reference to the respective instance of a data object or other part of the internal data structures 210 of the first component 204.

An inbound service module of the time delayed extension module 216 can configure the inbound service to store additional data generically. For subsequent calls, the additional data can then be stored in the generic container 220. An extensibility pre-configuration module time delayed extension module 216 can be called if the customer chooses to transform the additional fields into an extension. The extensibility pre-configuration module can specify the internal data structure identifier to be extended, the technical field name, the technical field type and optionally a field identifier to allow mapping of the new extension to an extended version of the internal data structure 210 that may be provided at a later date by the vendor, for example as discussed above. A data mapping module of the time delayed extension module 216 can map inbound additional fields to the results generated by the extensibility pre-configuration module to configure the inbound interface 202 to map the additional field to the created extension(s).

An upgrade module of the time delayed extension module 216 can be called when the first component 204 undergoes an upgrade. The upgrade module can map the data stored in the generic container 220 to newly field created fields added as part of the upgrade, for example by comparing the generically stored fields in the generic container to new fields brought with the upgrade. If an automatic mapping is possible, for example based on the above-discussed identifiers this can be performed. If an automatic upgrade is not possible, a key user task can be created, for example by a key-user task creation module of the time delayed extension module 216. The key-user task creation module can create a task in the business system for a key user who is assigned to an extensibility role. The task can contain information about the additional fields, the options offered, a mechanism or other process for initiating an extension, and the like.

The time delayed extension module 216 can also include an outbound interface configuration module. For an extended data object, the outbound interfaces that use the data object can be identified and the outbound interface can be configured to add the additionally stored fields in the outgoing messages. An example of an implementation of this functionality can include a business software architecture including three business systems, and the process flow is from business system one to two to three. If only business system one and three had been upgraded to contain a new version of a data object. Business system two can pass data included in extension fields of the data object that business system two does not support through from business system one to business three so that the process can continue operating even without an upgrade to business system two.

Figure 3:
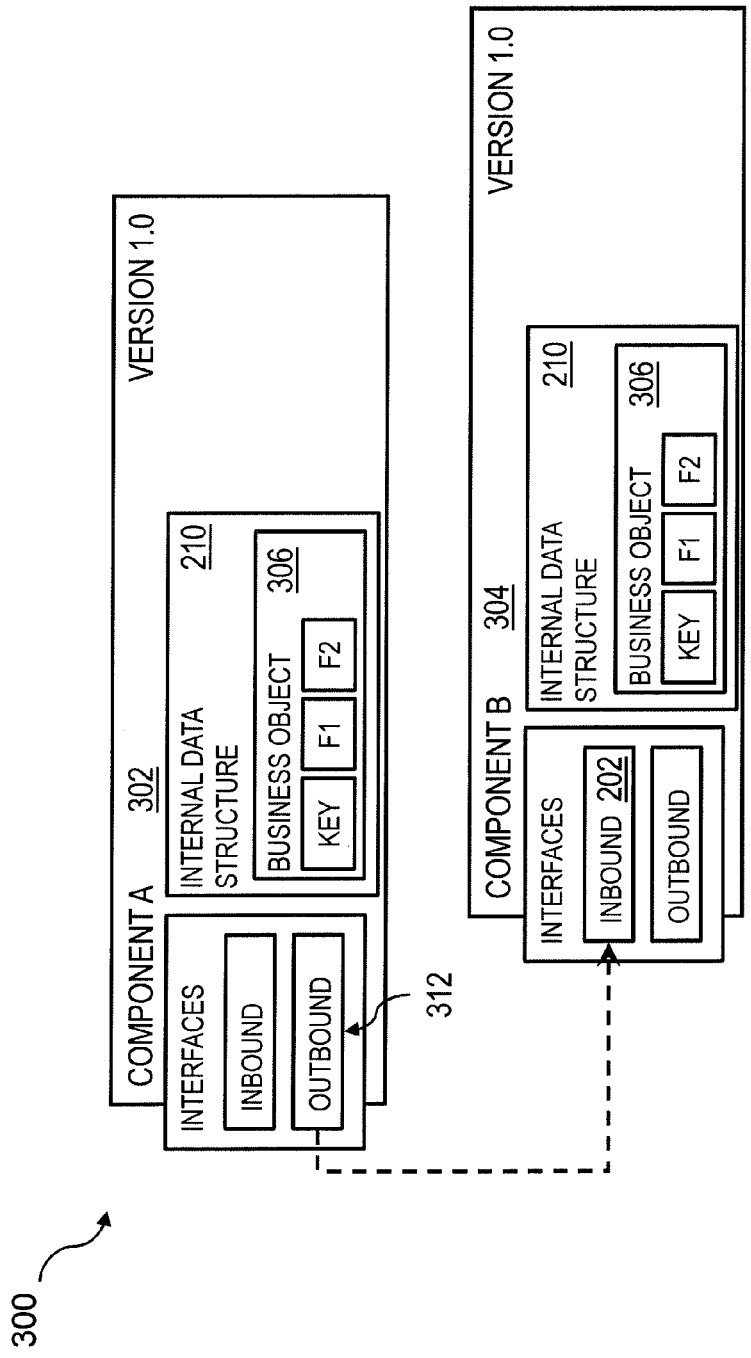
FIG. 3 is a data communication diagram showing communication between two components operating on a same version.

FIG. 3 shows a diagram 300 illustrating data exchange between a first application component 302 and a second application component 304 in which the two application components exchange data for business object 306. In FIG. 3, the first application component 302 and second application component 304 are both currently running the same version (in this example, version 1.0), so the business object 306 in the internal data structure 210 of each application component 302, 304 includes the same fields (KEY, F1, and F2 in this example) in both of the first application component 302 and the second application component 304. The inbound interface 202 of the second application component 304 can therefore map all of the fields of an instance of the business object received at the second application component from the outbound interface 312 of the first application component 302.

Figure 4:
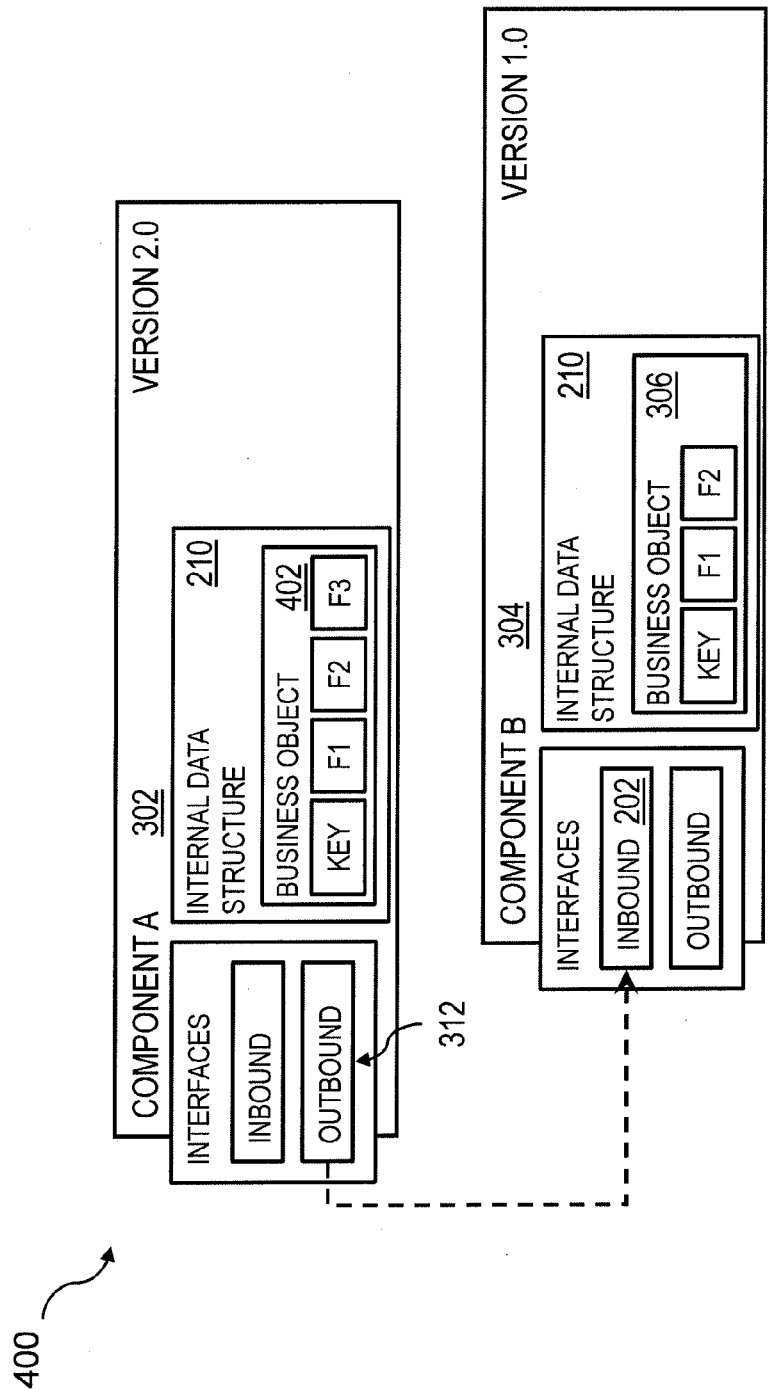
FIG. 4 is a data communication diagram showing communication between two components operating on different versions.

In the data exchange diagram 400 of FIG. 4, the first application component 302 has been upgraded to a newer version (version 2.0 in this example) in which the business object 306 is extended to an extended business object 402 that includes an additional field (F3 in this example). The outbound interface 312 of the first application component 302 can therefore send instances of an extended business object 402 that includes data in field F3. However, the inbound interface 202 of the second application component 304 cannot map data in field F3 to the business object 306 in the internal data structure 210 of the second application component 304. Absent the improvements provided by the current subject matter, when the second application component 304 is upgraded to the newer version (version 2.0), support would be available for the extended business object 402, but all business object instances created prior to the upgrade would not contain F3.

Figure 5:
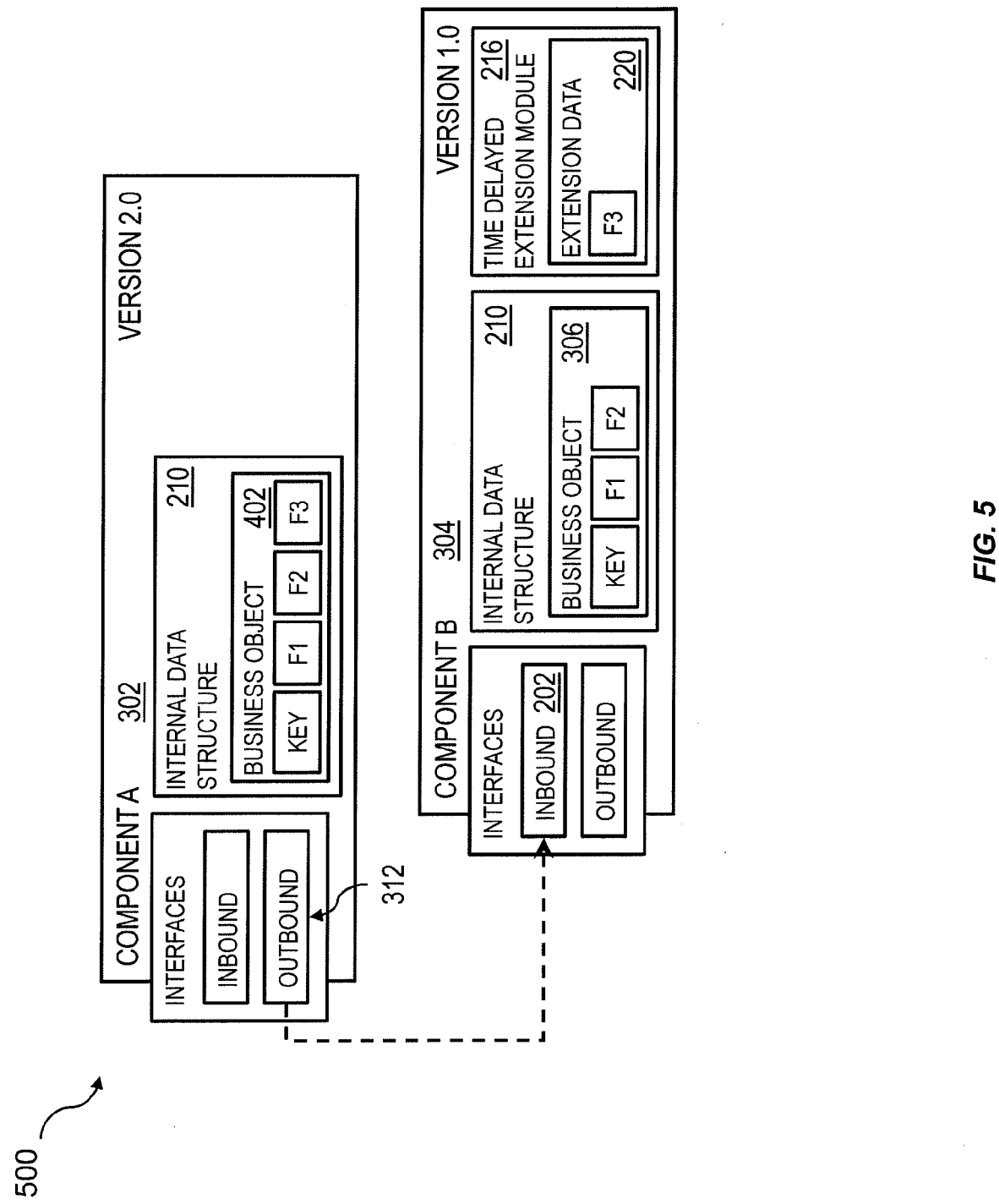
FIG. 5 is a data communication diagram showing communication between two components operating on different versions with a time delayed extension module on the component with the older version.

An implementation of the current subject matter is shown in the data exchange diagram 500 of FIG. 5. In an example, such as that shown in FIG. 4, where the second application component 304 is at an older or different version level such that it does not contain an extended business object 402 available from the first application component 302, the field F3 of the extended business object 402 that cannot be properly mapped by the inbound interface 202 to the internal data structure 210 is stored by the time delayed extension module 216 in a generic container 220, or alternatively, in a dedicated extension field. The data communication between the first application component 302 and the second application component 304 can thereby include field F3 and the data stored therein for each instance of the extended business object 402, and the second application component 304 is capable of storing these data, for example in the generic container 220. Upon an upgrade of the second application component 304 to the newer version (e.g. version 2.0) so that the internal data structure 210 of the second application component 304 supports the extended business object 402 and field F3, the content of F3 stored in the generic container 220 can be migrated to the standard field F3 for each instance of the extended business object 402 received prior to the upgrade.

Figure 6:
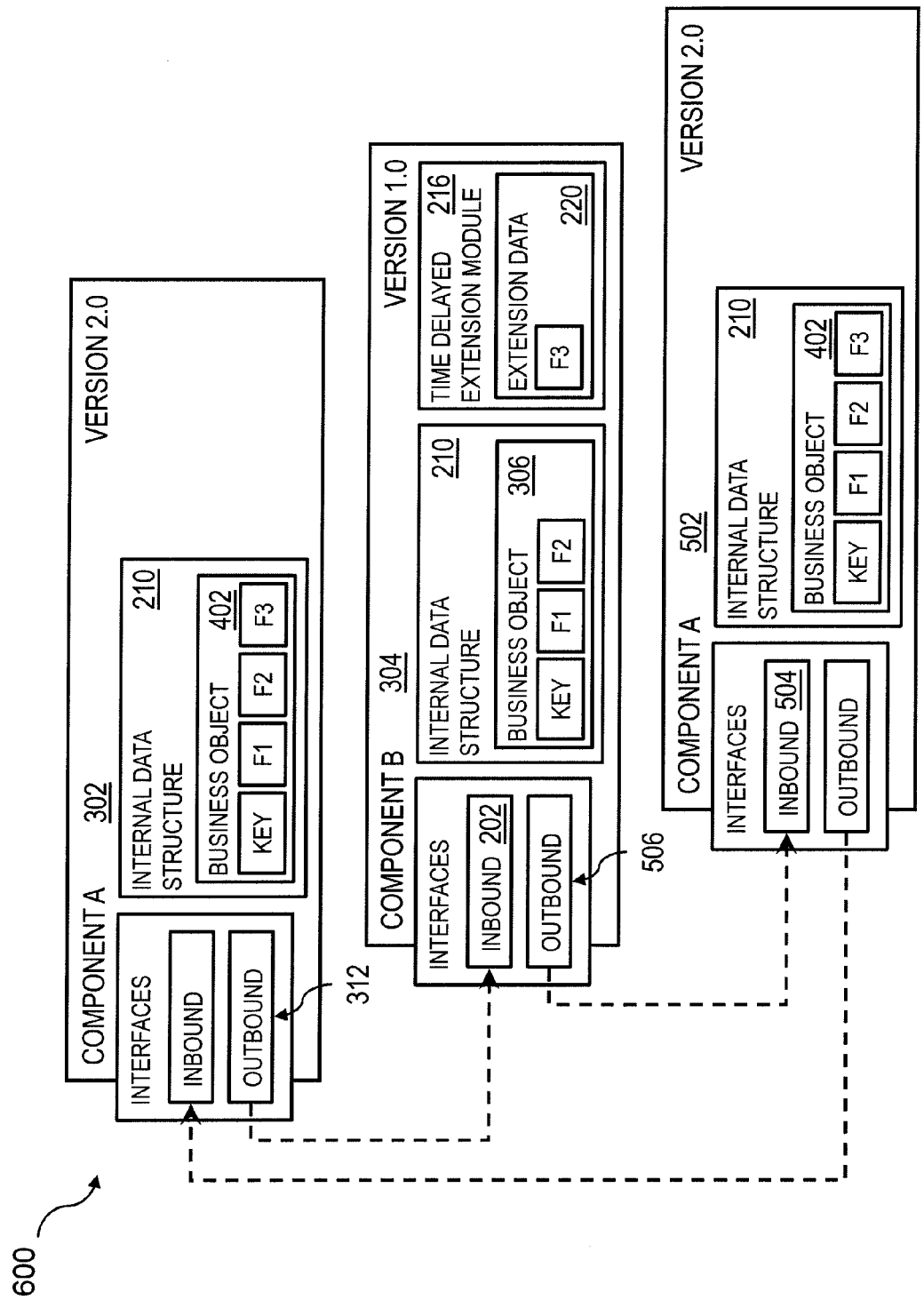
FIG. 6 is a data communication diagram showing communication between three components with one component operating on a version than the other two components.

In further example illustrated in the data exchange diagram 600 of FIG. 6, a third application component 502 also exists at the newer version (e.g. version 2.0 as shown in this example). As such, both the first application component 302 and the third application component include the extended business object 402 while the second application component 304 includes the non-extended business object 306. The first application component 302 communicates with the second application component 304 as discussed above and shown in FIG. 5. The second application component 304 communicates with the third application component 502, and the third application component 502 communicates with the first application component 302. Without the features of the current subject matter described herein, an instance of a data object passed from the first application component 302 to the third application component 502 via the second application component 304 would lack the new field F3 upon receipt at the inbound interface 504 of the third application component 502. According to an implementation of the current subject matter, however, data corresponding to the field F3 are retained in the generic container 220 of the second application component 304. When an instance of the extended data object 402 is to be sent from the outbound interface 506 of the second application component 304, the time delayed extension module 216 can retrieve the data corresponding to the extended fields from the generic container 220 and reconstruct the instance of the extended business object 402 such that when the third application component 502 receives the reconstructed instance, it appears to the inbound interface 504 as identical to having been sent from the outbound interface 312 of the first application component 302.

Figure 7:
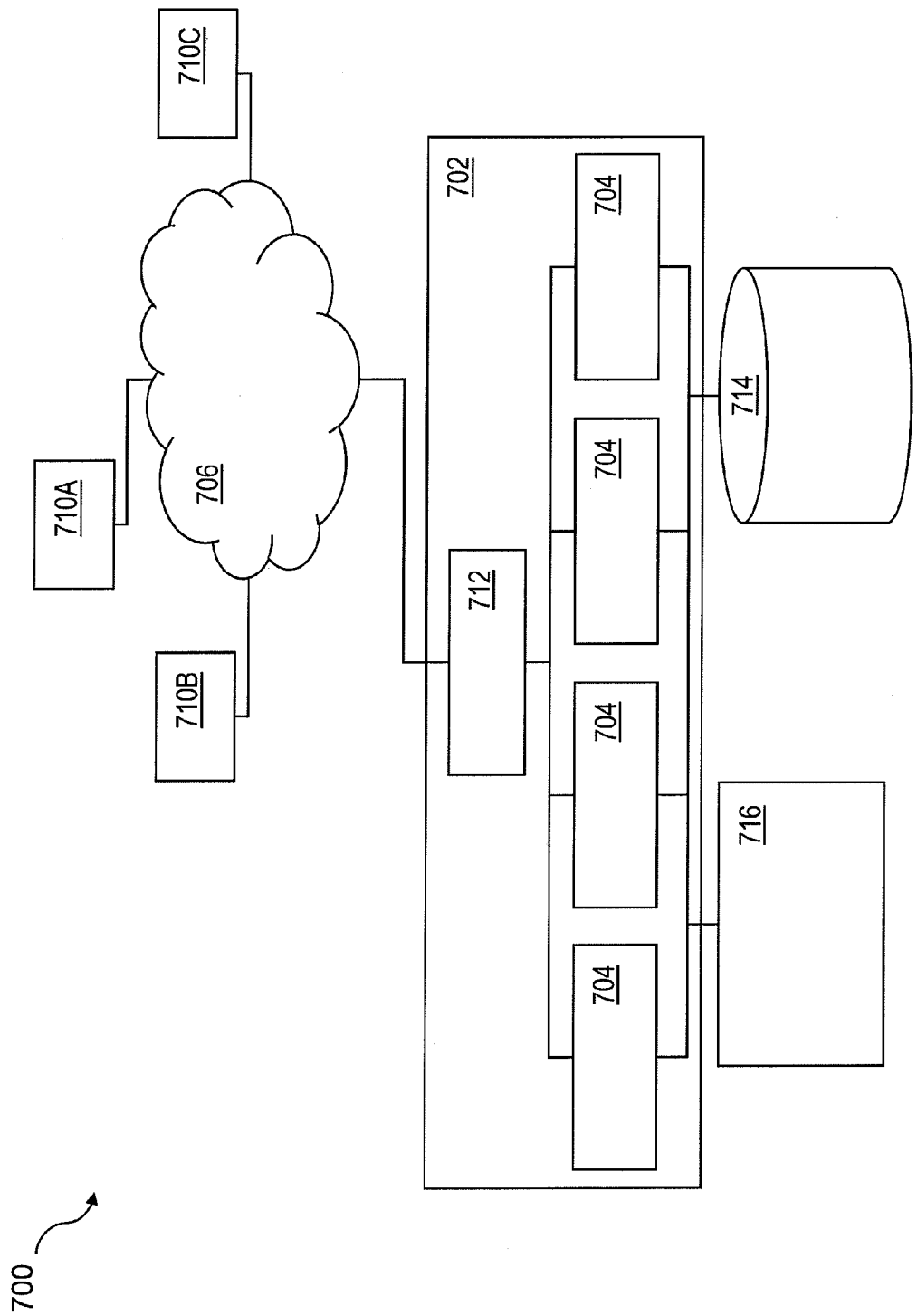
FIG. 7 is a diagram showing an example of a multi-tenant approach to providing customized software services to multiple organizations from a single architecture.

In an implementation, the current subject matter can be used in a multi-tenant software architecture to enable communication between a number of software components that may not always exist at the same interface versions. FIG. 7 shows a block diagram of a multi-tenant software delivery architecture 700 that includes an application server 702, which can in some implementations include multiple server systems 704 that are accessible over a network 706 from client machines operated by users at each of multiple organizations 710A-710C (referred to herein as "tenants" of a multi-tenant system) supported by a single software delivery architecture 700. For a system in which the application server 702 includes multiple server systems 704, the application server can include a load balancer 712 to distribute requests and actions from users at the one or more organizations 710A-710C to the one or more server systems 704. A user can access the software delivery architecture across the network using a thin client, such as for example a web browser or the like, or other portal software running on a client machine. The application server 702 can access data and data objects stored in one or more data repositories 714. The application server 702 can also serve as a middleware component via which access is provided to one or more external software components 716 that can be provided by third party developers.

Figure 8:
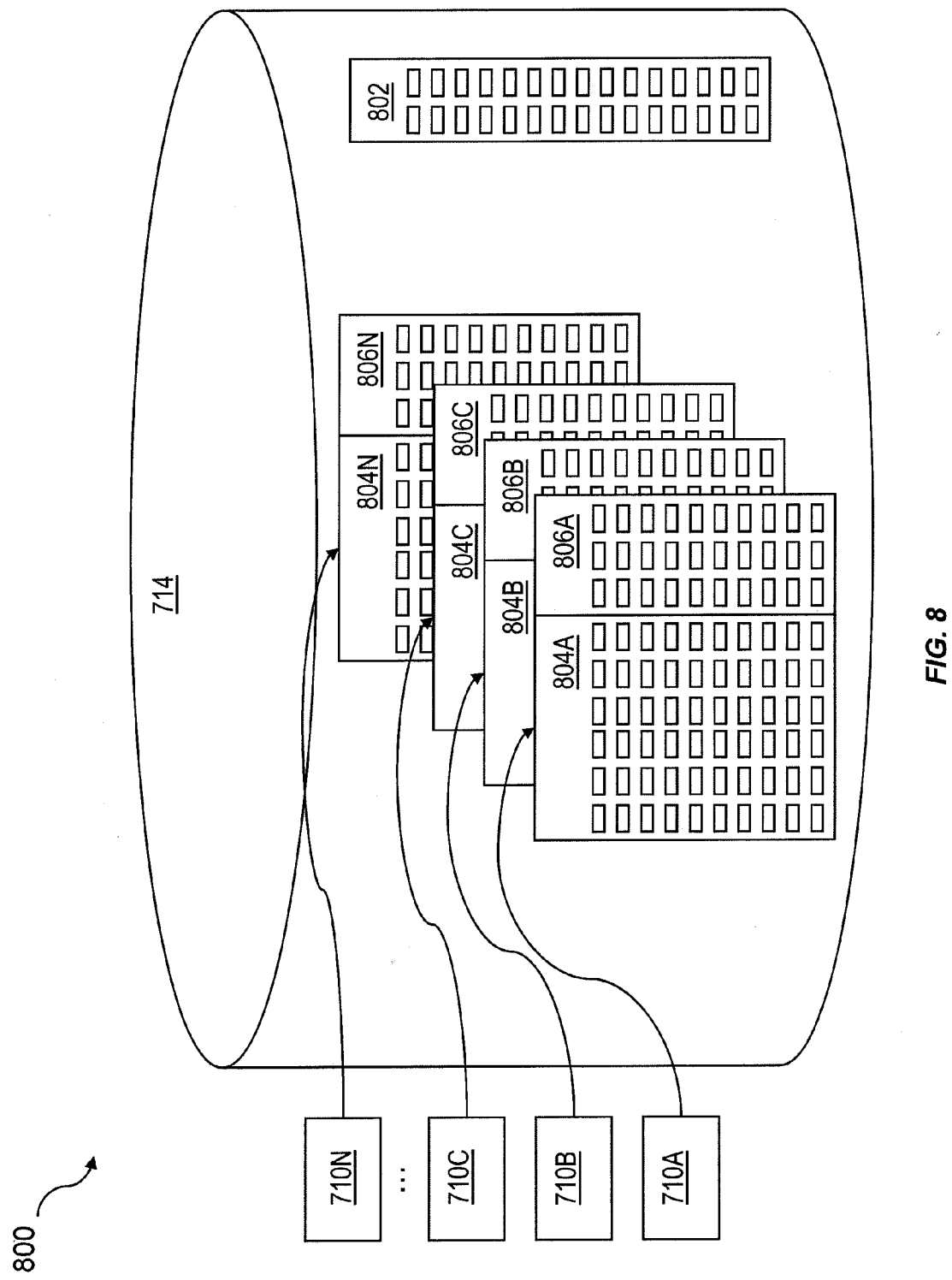
FIG. 8 is a diagram showing storage of both core software package data objects and tenant-specific data objects for each of multiple tenants of a multi-tenant system.

To provide for customization of the core software platform for each of multiple organizations supported by a single software delivery architecture 700, the data and data objects stored in the repository or repositories 714 that are accessed by the application server 702 can include three types of content as shown in FIG. 8: core software platform content 802, system content 804, and tenant content 806. Core software platform content 802 includes content that represents core functionality and is not modifiable by a tenant. System content 804 can in some examples be created by the runtime of the core software platform and can include core data objects that are modifiable with data provided by each tenant. For example, if the core software platform is an ERP system that includes inventory tracking functionality, the system content 804A-804N can include data objects for labeling and quantifying inventory. The data retained in these data objects are tenant-specific: for example, each tenant 710A-710N stores information about its own inventory. Tenant content 806A-806N includes data objects or extensions to other data objects that are customized for one specific tenant 710A-710N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 806 can include condition records in generated condition tables, access sequences, price calculation results, or any other tenant-specific values. A combination of the software platform content 802 and system content 804 and tenant content 806 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 702 that includes multiple server systems 704 that handle processing loads distributed by a load balancer 712. Potential benefits from such an arrangement can include, but are not limited to, high and reliably continuous application server availability and minimization of unplanned downtime, phased updating of the multiple server systems 704 to permit continuous availability (one server system 704 can be taken offline while the other systems continue to provide services via the load balancer 712), scalability via addition or removal of a server system 704 that is accessed via the load balancer 712, and de-coupled lifecycle processes (such as for example system maintenance, software upgrades, etc.) that enable updating of the core software independently of tenant-specific customizations implemented by individual tenants.

The core software platform may not always exist at the same interface version as the one or more external software components 716. As a middleware integrator that facilitates cooperative business processes that can involve the external software components 716 as well as one or more other business software components on local systems at a client machine or machines accessing a tenant 710, the application server 702 is advantageously capable of maintaining and passing on data objects (e.g. business objects) and other data structures regardless of the interface version without losing information about these data structures. Use of a time delayed extension module as described above as part of one or more of the application sever 702, the external software components 716, and/or at client machines of customer organizations can provide this capability and improve overall data communication efficiency in a multi-tenant system.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed:

1. A computer-implemented method comprising:
receiving, at a first time, a data object from a second software component at a first inbound interface of a first software component, the first inbound interface being configured to map a first feature of the data object to at least one first internal data structure of the first software component but not configured to map a second data feature of the data object to any corresponding internal data structure of the first software component;
storing characteristic information of the second data feature in a generic data container added to the internal data structure, the characteristic information comprising a value of the second data feature and metadata describing an identifier of the second data feature; and
forming a reconstructed data object at a second time subsequent to the first time, the reconstructing comprising recreating the second data feature based on the characteristic information retrieved from the generic data container and combining the recreated second data feature with the first data feature retrieved from the at least one first internal data structure;
sending the reconstructed data object to a third component via an outbound interface of the first component, the third component comprising a third inbound interface configured to map the second data feature to at least one third internal data structure of the third software component, the sending being completed such that the reconstructed data object appears to the third software component as though the reconstructed data object were formed by retrieving the second data feature from at least one second internal data structure that is not present in the first component;
wherein the receiving, the storing, the forming, and the sending are performed by at least one system comprising at least one processor.

2. A method as in claim 1, wherein the second component and the third component are configured to a newer version level of a software architecture than is the first component, the newer version comprising the second data feature that is not present in an older version to which the first component is configured.

3. A method as in claim 1, wherein the second data feature comprises an extension field used by the first component but not by the second component.

4. A method as in claim 1, wherein the first software component comprises an application server of a multi-tenant software architecture and the second software component comprises an external software component whose functionality is integrated into the multi-tenant software architecture, the multi-tenant architecture comprising the application server and a data repository, the application server providing access for each of a plurality of organizations to one of a plurality of client tenants, each of the plurality of client tenants comprising a customizable, organization-specific version of a core software platform, the data repository comprising core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

5. A computer program product comprising a non-transitory machine-readable medium storing instructions that, when executed by at least one processor, cause the at least one processor to perform operations comprising:
receiving, at a first time, a data object from a second software component at a first inbound interface of a first software component, the first inbound interface being configured to map a first feature of the data object to at least one first internal data structure of the first software component but not configured to map a second data feature of the data object to any corresponding internal data structure of the first software component;

storing characteristic information of the second data feature in a generic data container added to the internal data structure, the characteristic information comprising a value of the second data feature and metadata describing an identifier of the second data feature; and forming a reconstructed data object at a second time subsequent to the first time, the reconstructing comprising recreating the second data feature based on the characteristic information retrieved from the generic data container and combining the recreated second data feature with the first data feature retrieved from the at least one first internal data structure;

sending the reconstructed data object to a third component via an outbound interface of the first component, the third component comprising a third inbound interface configured to map the second data feature to at least one third internal data structure of the third software component the sending being completed such that the reconstructed data object appears to the third software component as though the reconstructed data object were formed by retrieving the second data feature from at least one second internal data structure that is not present in the first component.

6. A computer program product as in claim 1, wherein the second component and the third component are configured to a newer version level of a software architecture than is the first component, the newer version comprising the second data feature that is not present in an older version to which the first component is configured.

7. A computer program product as in claim 5, wherein the second data feature comprises an extension field used by the first component but not by the second component.

8. A computer program product as in claim 5, wherein the first software component comprises an application server of a multi-tenant software architecture and the second software component comprises an external software component whose functionality is integrated into the multi-tenant software architecture, the multi-tenant architecture comprising the application server and a data repository, the application server providing access for each of a plurality of organizations to one of a plurality of client tenants, each of the plurality of client tenants comprising a customizable, organization-specific version of a core software platform, the data repository comprising core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

9. A computer program product as in claim 5, wherein the reconstructed data object comprises the data object.

10. A system comprising:
computer hardware comprising at least one processor; and
a machine-readable medium storing instructions that, when executed by the at least one processor, cause the at least one processor to perform operations comprising:

receiving, at a first time, a data object from a second software component at a first inbound interface of a first software component, the first inbound interface being configured to map a first feature of the data object to at least one first internal data structure of the first software component but not configured to map a second data feature of the data object to any corresponding internal data structure of the first software component;

storing characteristic information of the second data feature in a generic data container added to the internal data structure, the characteristic information comprising a value of the second data feature and metadata describing an identifier of the second data feature; and forming a reconstructed data object at a second time subsequent to the first time, the reconstructing comprising recreating the second data feature based on the characteristic information retrieved from the generic data container and combining the recreated second data feature with the first data feature retrieved from the at least one first internal data structure;

sending the reconstructed data object to a third component via an outbound interface of the first component, the third component comprising a third inbound interface configured to map the second data feature to at least one third internal data structure of the third software component, the sending being completed such that the reconstructed data object appears to the third software component as though the reconstructed data object were formed by retrieving the second data feature from at least one second internal data structure that is not present in the first component.

11. A system as in claim 10, wherein the second component and the third component are configured to a newer version level of a software architecture than is the first component, the newer version comprising the second data feature that is not present in an older version to which the first component is configured.

12. A system as in claim 10, wherein the second data feature comprises an extension field used by the first component but not by the second component.

13. A system as in claim 10, wherein the first software component comprises an application server of a multi-tenant software architecture and the second software component comprises an external software component whose functionality is integrated into the multi-tenant software architecture, the multi-tenant architecture comprising the application server and a data repository, the application server providing access for each of a plurality of organizations to one of a plurality of client tenants, each of the plurality of client tenants comprising a customizable, organization-specific version of a core software platform, the data repository comprising core software platform content that relates to the operation of the core software platform that is common to all of the plurality of client tenants, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

* * * * *